United States Patent
Hanson et al.

(10) Patent No.: US 11,948,602 B2
(45) Date of Patent: Apr. 2, 2024

(54) OFFSET SPIRAL DATA TRACK FORMAT FOR DATA STORAGE DEVICES

(71) Applicant: Western Digital Technologies, Inc., San Jose, CA (US)

(72) Inventors: Weldon M. Hanson, Rochester, MN (US); Richard Galbraith, Rochester, MN (US); Iouri Oboukhov, Rochester, MN (US); Niranjay Ravindran, Rochester, MN (US); Derrick Burton, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/853,266

(22) Filed: Jun. 29, 2022

(65) Prior Publication Data
US 2024/0005959 A1    Jan. 4, 2024

(51) Int. Cl.
G11B 20/12    (2006.01)
G11B 5/012    (2006.01)
G11B 21/08    (2006.01)

(52) U.S. Cl.
CPC .............. *G11B 21/08* (2013.01); *G11B 5/012* (2013.01)

(58) Field of Classification Search
CPC .............. G11B 20/12; G11B 5/59633; G11B 20/10222; G11B 5/5543; G11B 7/00736
USPC ............... 360/48; 369/275.1, 275.2
See application file for complete search history.

(56) References Cited

U.S. PATENT DOCUMENTS

| | | | |
|---|---|---|---|
| 4,502,082 A | 2/1985 | Ragle et al. | |
| 5,835,299 A | 11/1998 | Lee et al. | |
| 6,577,561 B2 * | 6/2003 | Pirot ............... | G11B 20/00586 369/30.1 |
| 8,885,277 B1 | 11/2014 | Erden et al. | |
| 8,976,477 B1 | 3/2015 | Hwang et al. | |
| 9,208,810 B1 | 12/2015 | Nie et al. | |
| 9,489,260 B1 | 11/2016 | Hong et al. | |
| 9,632,863 B2 | 4/2017 | Galbraith et al. | |
| 9,837,115 B1 | 12/2017 | Sridhara et al. | |
| 9,922,678 B2 | 3/2018 | Burd et al. | |

(Continued)

FOREIGN PATENT DOCUMENTS

| | | | |
|---|---|---|---|
| CN | 1128386 | 1/2002 | |
| JP | 2009187620 | * 8/2009 | ............. G11B 20/12 |

OTHER PUBLICATIONS

Nilchim, "Write Encroachment Detection in Shingle Magnetic Recording Using Feed-Forward Position Error Signal from Adjacent Track," Asian Institute of Technology School of Engineering and Technology, Thailand, May 2015, 61 pgs., available online at https://rb.gy/qdxc5t.

(Continued)

*Primary Examiner* — Nabil Z Hindi
(74) *Attorney, Agent, or Firm* — PATENT LAW WORKS LLP

(57) ABSTRACT

Example control circuitry, data storage devices, and methods to provide a spiral data track format that is different from the underlying servo track format are described. The data storage device may include a storage medium configured with a plurality of tracks in at least one continuous spiral pattern and a head actuated over the storage medium. The data tracks may be written to the storage medium with track lengths that are different than a single revolution of the storage medium.

22 Claims, 6 Drawing Sheets

(56) References Cited

U.S. PATENT DOCUMENTS

| | | |
|---|---|---|
| 9,946,599 B1 | 4/2018 | Burd |
| 10,284,230 B2 | 5/2019 | Yamamoto |
| 10,530,390 B2 | 1/2020 | Oboukhov et al. |
| 11,157,364 B1 | 10/2021 | Rice et al. |
| 2005/0078395 A1 | 4/2005 | Chu et al. |
| 2013/0114159 A1 | 5/2013 | Szita |

OTHER PUBLICATIONS

NVIDIA Corporation, "NVIDIA Tesla V100 GPU: The World's Most Advanced Data Center GPU," NVIDIA Corporation Volta Architecture Whitepaper, Aug. 2017, available online at https://images.nvidia.com/content/volta-architecture/pdf/volta-architecture-whitepaper.pdf, 58 pgs.

* cited by examiner

OFFSET SPIRAL DATA TRACK FORMAT FOR DATA STORAGE DEVICES

TECHNICAL FIELD

The present disclosure relates to data track formats for data storage devices. In particular, the present disclosure relates to spiral data track formats that are offset from physical revolutions.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address, synchronization information for synchronizing timing and gain control, and servo bursts for fine positioning) which is read by the head and processed by a servo control system to control the actuator arm as it seeks from track to track and follows tracks during read/write operations. The magnetic disk acts as a non-volatile storage medium for storing data.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector $6_i$ further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208,
arms 210, and/or actuators 212. A preamplifier (preamp or preamplifier circuit) 218 controls the read and write signals to the corresponding read and write elements (e.g., read element 214 and write element 216) of each head (e.g., head 208). Preamplifier 218 may be attached to a flex circuit 220 that provides a data and power bus connection to a printed circuit board (not shown) with other drive control circuitry, such as a disk drive controller, through a flex interface connector 222.

Spiral data track formats may eliminate track seek operations between physical data tracks, enabling improved sequential write and sequential read performance. Spiral data track formats include servo sectors and data sectors along the spiral track pattern. In some configurations, tracks may be written consecutively within zones of adjacent tracks. Spiral track formats may be compatible with shingled magnetic recording, where the edges of concentrically adjacent track edges are overwritten to reduce track spacing. In some configurations, multiple spiral patterns may be used on the same disk, such as one spiral from the outer diameter (OD) to the middle diameter (MD) and one spiral from the inner diameter (ID) to the MD. Additional benefits of spiral data formats may be realized by increasing the flexibility to define and use different data track lengths that are not limited to a single revolution of the storage medium.

There is a need for technology that improves spiral data track formats for efficient command execution and/or device throughput.

SUMMARY

Various aspects for data storage devices that provide an offset spiral data track format that is different from the underlying servo track format are described, particularly data tracks with lengths greater or less than a single revolution of the disk with servo sector synchronization fields aligned to single revolutions.

One general example includes a data storage device including: a storage medium configured for a plurality of data tracks written in at least one continuous spiral pattern; a head actuated over a surface of the storage medium; and a control circuitry configured to write, to the storage medium, data tracks having track lengths that are different than a single revolution of the storage medium, where the track lengths are comprised of data sectors along the at least one continuous spiral pattern.

Implementations may include one or more of the following features. The track lengths may be less than the single revolution of the storage medium. The track lengths of adjacent data tracks may be less than the single revolution by at least a number of data sectors; and the number of data sectors may be at least a seek distance for moving the head from an end of a target track to a start of the target track during a seek back operation. The track lengths may be greater than the single revolution of the storage medium. The track lengths of the data tracks may be less than a first number of revolutions by at least a second number of data sectors; and the number of data sectors may be at least a seek distance for moving the head from an end of a target track to a start of the target track during a seek back operation. The plurality of data tracks may include a first group of adjacent tracks having a first sector frequency and a second group of adjacent tracks having a second sector frequency; and the first sector frequency may be different than the second sector frequency. The first group of adjacent tracks may have aligned sector boundaries across data sectors in adjacent tracks; and the second group of adjacent tracks may have aligned sector boundaries across data sectors in adjacent tracks. The control circuitry may be further configured to: write data tracks in the first group of adjacent tracks with overlapping edges between circumferentially adjacent tracks; and decode, during error recovery operations, data tracks in the first group of adjacent tracks using inter-track-interference cancellation across aligned data sectors. The data sectors may include preamble fields comprised of preamble field patterns; the data sectors on a first revolution of the at least one continuous spiral pattern may have a first preamble field pattern; the data sectors on a second revolution of the at least one continuous spiral pattern may have a second preamble field pattern; the data sectors on the first revolution may be adjacent the data sectors in the second revolution in a cross-track direction; and the first preamble field pattern may be orthogonal to the second preamble field pattern. The data sectors may include sync word fields comprised of sync word patterns; the data sectors on a first revolution of the at least one continuous spiral pattern may have a first sync word pattern; the data sectors on a second revolution of the at least one continuous spiral pattern may have a second sync word pattern; the data sectors on the first revolution may be adjacent the data sectors in the second revolution in a cross-track direction; and the first sync word pattern may be orthogonal to the second sync word pattern. The control circuitry may be further configured to: randomize data being written to the data sectors; and set a seed value for randomization based on the single revolution of the storage medium.

Another general example includes a method including: determining, on a storage medium of a data storage device, a plurality of servo sectors configured for single revolutions of the storage medium; and writing, to the storage medium of the data storage device, a plurality of data tracks along at least one continuous spiral pattern, where the plurality of data tracks is may include of data sectors and has track lengths that are different than a single revolution of the storage medium.

Implementations may include one or more of the following features. The track lengths may be less than the single revolution of the storage medium. The method may include moving, during a seek back operation, a head of the data storage device a seek distance from an end of a target track to a beginning of the target track, where: the target track is among the plurality of data tracks; the track lengths of adjacent data tracks in the plurality of data tracks are less than the single revolution of the storage medium by at least a number of data sectors; and the number of data sectors is at least the seek distance. The track lengths may be greater than the single revolution of the storage medium. The method may include moving, during a seek back operation, a head of the data storage device a seek distance from an end of a target track to a beginning of the target track, where: the target track is among the plurality of data tracks; the track lengths of the plurality of data tracks are less than a first number of revolutions by at least a second number of data sectors; and the number of data sectors is at least the seek distance. The method may include: writing, in the plurality of data tracks, a first group of adjacent tracks having a first sector frequency; and writing, in the plurality of data tracks, a second group of adjacent tracks having a second sector frequency, where the first sector frequency is different than the second sector frequency, the first group of adjacent tracks have aligned sector boundaries across data sectors in adjacent tracks, and the second group of adjacent tracks have aligned sector boundaries across data sectors in adjacent tracks. The method may include: writing data tracks in the first group of adjacent tracks with overlapping edges between circumferentially adjacent tracks; and decoding, during error recovery operations, data tracks in the first group of adjacent tracks using inter-track-interference cancellation across aligned data sectors. The method may include determining, using preamble fields in the data sectors, data sector synchronization, where: the preamble fields are comprised of preamble field patterns; the data sectors on a first revolution of the at least one continuous spiral pattern have a first preamble field pattern; the data sectors on a second revolution of the at least one continuous spiral pattern have a second preamble field pattern; the data sectors on the first revolution are adjacent the data sectors in the second revolution in a cross-track direction; and the first preamble field pattern is orthogonal to the second preamble field pattern. The method may include determining, using sync word fields in the data sectors, data sector synchronization, where: the sync word fields are may include of sync word patterns; the data sectors on a first revolution of the at least one continuous spiral pattern have a first sync word pattern; the data sectors on a second revolution of the at least one continuous spiral pattern have a second sync word pattern; the data sectors on the first revolution are adjacent the data sectors in the second revolution in a cross-track direction; and the first sync word pattern is orthogonal to the second sync word pattern. The method may include: randomizing data being written to the data tracks; and setting a seed value for randomization based on servo sectors corresponding to the single revolution of the storage medium.

Still another general example includes a data storage device including: a storage medium configured for a plurality of data tracks written in at least one continuous spiral pattern; a head actuated over a surface of the storage medium; and means for writing, to the storage medium, data tracks having track lengths that are different than a single revolution of the storage medium, where the track lengths are may include of data sectors along the at least one continuous spiral pattern.

The present disclosure describes various aspects of innovative technology capable of improving processing times and/or format efficiency using spiral data track formats that uncouple data track length from servo sectors based on single revolutions. The various embodiments include disk formats and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage device performance, such as by using spiral track formats with data track lengths that are different than a single revolution without losing servo processing efficiency. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

This disclosure includes a plurality of features related to spiral data track formats and, more specifically, data track formats with track lengths shorter than a revolution (resulting in a greater number of data tracks than concentric tracks of the same track pitch) or track lengths longer than a revolution (resulting in a lower number of data tracks than concentric tracks of the same track pitch). Concentric data tracks and prior spiral tracks may use a revolution of the storage medium to determine distance and timing along each concentric track or portion of the spiral track that corresponds to a single full revolution. In this context, the track length may include track headers, data sectors, parity sectors, padding, and other track formatting features that maintain data tracks generally synchronized with single revolutions of the storage medium. Variable frequencies across concentric regions of the disk and adjacent track skew (where the start of one track is intentionally offset radially from the start of the next track to better enable post-read processing and track-to-track seeking for sequential reads and writes) do not change the effective track length or the general allocation of a number of tracks equal to the number of revolutions.

The various features described herein may be mixed and matched for spiral data track formatting for short and/or long tracks and their description in particular example combinations should be regarded as instructive, but non-limiting. In addition, a single data storage device may include different storage media (e.g., multiple disks) and/or a storage medium divided into multiple regions with different formatting characteristics. For example, a single disk surface may include multiple spiral data track patterns for different portions of the disk (e.g., ID to MD and OD to MD) and/or different spirals supporting different frequencies or other features, such as spiral interruptions between zones or groups of zones with different formatting characteristics. Reference may be made to adjacent tracks and/or sets or groups of adjacent tracks with a general intent to refer to a series of data tracks following one another along the spiral (which also results in at least portions of cross-track adjacent data sectors shared by one track and the next) within a similarly formatted region of the storage medium, such as a zone or realm.

Figure 1:
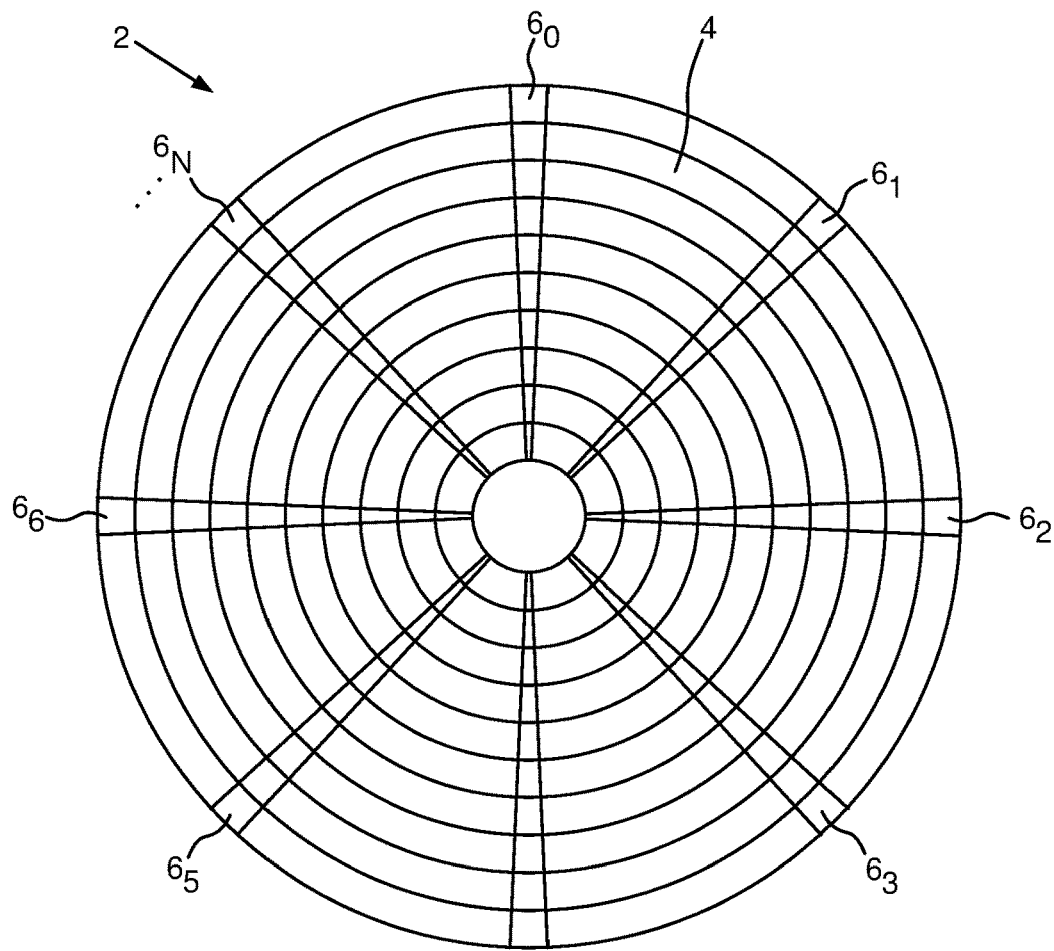
FIG. 1 is a diagram of a prior art disk format comprising a plurality of servo tracks defined by servo sectors.
Figure 2:
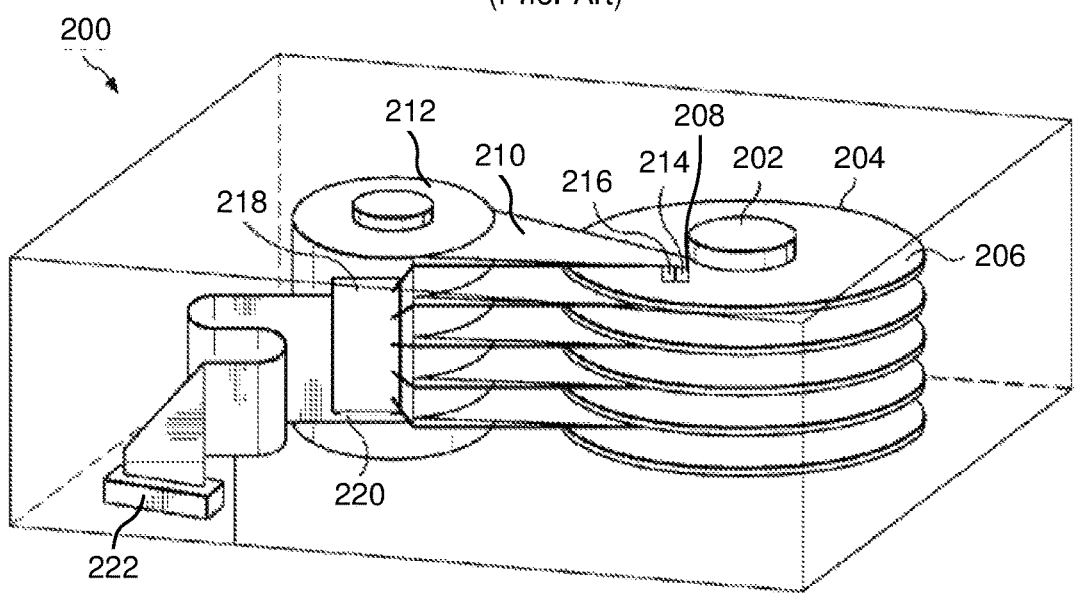
FIG. 2 is a diagram of an example data storage device in the form of a disk drive comprising heads actuated over disk surfaces.
Figure 3:
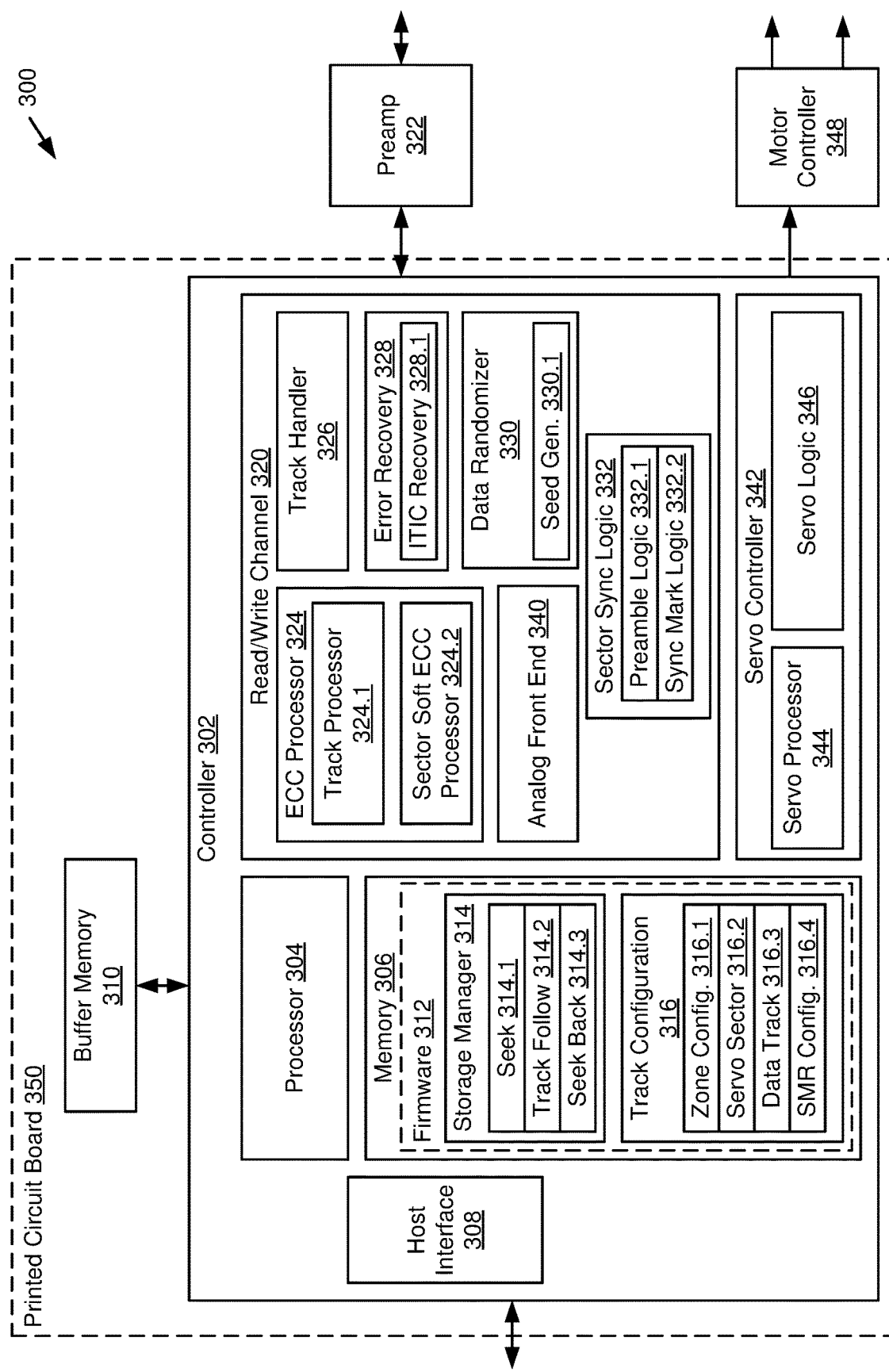
FIG. 3 is a block diagram of a configuration of data storage device electronics for a controller, read/write channel, and servo controller configured for spiral data tracks.

FIG. 3 shows a portion of example control circuitry 300 for a data storage device, such as a hard disk drive (HDD). In the example shown, control circuitry 300 may include one or more controllers. Controller 302 may comprise a storage device controller configured to receive host storage commands, process storage operations for writing, reading, and managing data stored to non-volatile storage media in the disk drive, such as the magnetic media disks in FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or submodules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read heads over a desired track on the storage medium, applying a read voltage to the read head through preamp 322, receiving the read data in read/write channel 320, decoding the read data from the read head into decoded bit data returned to storage manager 314 (and/or buffer memory 310).

In some configurations, storage manager 314 may use servo commands to servo controller 342 to initiate and control head position to support read, write, and other storage operations. For example, storage manager 314 may include a seek command 314.1 for initiating a seek operation through servo controller 342 to position the head over a target data track. Seek command 314.1 may include a data track identifier used by servo controller 342 to navigate to the start position on the spiral of the data track using track identifiers embedded in the servo sectors. Storage manager 314 may include a track follow command 314.2 for track follow operations staying on a target track along the length of that track and servo controller 342 may use a combination of fine positioning information (e.g., servo bursts), synchronization information (e.g., preamble fields and sync mark fields), and servo track identifiers in the servo sectors (which may be mapped to track identifiers and position information for the spiral data tracks) to follow the spiral and maintain position integrity (based on position error signal feedback). Storage manager 314 may include a seek back command 314.3 for seek back operations to return to the start position of the track just read, generally for error recovery operations, and servo controller may use a seek similar to the seek operation described above. In some configurations, spiral data tracks may be formatted with track lengths shorter than a non-zero integer number of rotations by a number of data sectors selected to enable a short seek path from the end position of a data track on the spiral to the start position of that data track. For long tracks, the non-zero integer number is greater than one, so the track length may be less than two rotations, less than three rotations, etc. Storage manager 314 may include other and/or different servo commands for coordinating storage operations through servo controller 342.

Controller firmware 312 may include a track configuration 316 based on how the storage medium has been configured for data storage. Track configuration 316 may include a combination of servo formatting and data track formatting. Track configuration 316 may support a defined block size and corresponding number and size of sectors per track. Track configuration 316 may include data track formatting as continuous tracks, where the tracks form a continuous spiral pattern with start and end positions that are not on the same circumference. In some configurations, track configuration 316 may support variable track formats for different regions of the storage medium, such as variable frequency across different circumferential zones or regions. For example, incremental frequency change may be used to maintain constant density by track or grouping of tracks to achieve zone recording. In some configurations, the spiral may be broken at zone boundaries. In some configurations, incremental frequency change may be done incrementally by sector or groups of sectors in the down track direction and may be used to increase areal density. Track configuration 316 may be stored in a set of media configuration parameters for the servo and data track formats.

Example sets of media configuration parameters may include a zone configuration 316.1, servo sector configuration 316.2, data track configuration 316.3, and/or shingled magnetic recording (SMR) configuration 316.4. For example, zone configuration 316.1 may define groups of adjacent tracks along the spiral with shared zone characteristics, such as a zone frequency. In some configurations, zones may be defined by continuous data tracks (and corresponding data sectors) comprising 256 megabyte (MB) blocks. Servo sector configuration 316.2 may define the servo sector formats used for the storage device and may include consistent servo preambles, Servo Address Mark (SAM) patterns, and null burst fields on each servo track. The servo track identifier fields may use Grey code encode/decode to minimize the number of bits that transition when crossing tracks. Data track configuration 316.3 may define the track length (e.g., in data sectors) and data sector frequency/size, and include allocation of parity sectors and other track-related data. Data track configuration 316.3 may also define a set of data sector fields that lead the sector data and include alternating preamble and sync word fields, such that data sectors that are adjacent in the cross-track direction may easily be distinguished. Data track configuration 316.3 may also include track synchronization, identification, and/or other header information on a logical track basis. Data track configuration 316.2 may be mapped to servo sector configuration 316.2 to allow concentric servo position identifiers from the servo signal to be used to locate and follow the logical tracks along the spiral data tracks. For example, data tracks having a configured track pitch may be mapped to previously written servo tracks having a different (smaller) track pitch using a polynomial function. SMR configuration 316.4 may include target track width and overlap parameters for concentrically adjacent portions of spiral formats without guard bands. Other track configuration and/or related media formatting parameters are possible.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host. In some embodiments, read/write channel 320 may include an analog front end 340 configured to receive the analog read signal from preamp 322 and convert it into a digital read signal for processing by other components of read/write channel 320. For example, analog front end 340 may include an analog-digital converter (ADC), timing circuit, and one or more filters, equalizers, and/or other signal conditioning components for generating the digital read data. Analog front end 340 may use servo information from servo controller 342 to establish gate timing, establish phase lock, and/or set gain for the ADC and/or other components.

In some configurations, read write channel 320 may include an ECC processor 324 configured to receive read data for a data track from the read heads and use iterative ECC processing to decode the received read data into decoded data for further processing by controller firmware 312 and/or communication to the host. For example, ECC processor 324 may include one or more soft output Viterbi algorithm (SOVA) detectors and low density parity check (LDPC) decoders operating on multi-bit encoded symbols to decode each sector of data received by read/write channel 320. In some configurations, ECC processor 324 may include distinct processing components, such as a track processor 324.1 and a sector soft ECC processor 324.2. For example, track processor 324.1 may be configured to process each data sector in a data track (sequentially or using some level of parallelism) using the parity data encoded with the user data within each sector. Sector soft ECC processor 324.2 may be configured to process sectors that failed to be correctly decoded by track processor 324.1 using parity sector data stored at the end of the data track. In some configurations, track processor 324.1 may sequentially process each data sector in the data track during an initial processing phase to decode the data block in the track and sectors that are not successfully decoded by track processor 324.1 may be selectively stored to sector memory for postprocessing by sector soft ECC processor 324.2. Processing by sector soft ECC processor 324.2 may necessarily follow the complete read of the track and parity sector ECC data so that the parity sector data may be used by sector soft ECC processor 324.2 to postprocess the failed sectors. Separately managing and resourcing track processor 324.1 and sector soft ECC processor 324.2 may enable overlapping sequential processing and postprocessing with relatively small additional memory and/or processing power.

Read/write channel 320 may include a track handler 326 configured to manage data and processing/postprocessing status for data tracks. For example, data tracks may be managed as a data unit. For example, read/write channel 320 may read all data sectors from a data track and process those sectors until all data sectors in the data track are successfully decoded or an error condition is reached. If an error condition is reached, read/write channel 320 may include error recovery logic 328 governing various post-processing and retry schemes for attempting to decode the data sectors in the data track. In some configurations, sectors may be aligned across circumferentially adjacent data sectors corresponding to adjacent revolutions and circumferences, particularly for SMR formats. In these configurations, inter-track-interference cancellation (ITIC) recovery 328.1 may be used to aid recovery of sectors under track squeeze during error recovery options. In long track formats, circumferentially adjacent sectors may be present in the same data track, aiding in the availability of adjacent sector information for ITIC recovery 328.1. In some configurations, error recovery logic 328 may include some error recovery processing within read/write channel 320 and raise other error recovery conditions to storage manager 314. For example, reread decisions may include interaction with storage manager 314 to initiate seek back operations through servo controller 342.

In some configurations, read/write channel 320 may include a data randomizer 330 used to randomize host data and/or parity data prior to writing the data tracks on the storage medium. For example, track configurations may include track randomization of host data and parity sector randomization of parity sector data, where parity sectors may be embedded both in the logical track (host data sectors) and at end of track (interleaved track parity in distinct parity sectors). Data randomization may be performed to ensure that cyclic host binary patterns do not create gain and timing loop issues during the read back and detection process in read/write channel 320. Randomization may provide some level of protection against adjacent track misdetection and help assure uniqueness of parity sectors avoiding direct current (DC) runs, for example, when an even count of sectors containing same customer data, such as format 0x00 user data, are XORed for sub-track or track parity generation. In some configurations, randomizer 330 uses unique seed values for different sectors or sets of sectors and may include seed generator 330.1 for this purpose. For example, a unique seed may be determined for each sector to maintain orthogonality, but may add complexity to integration and firmware, particularly when diagnosis of error events is required for parity sectors and error path reconstruction. Randomization based on single revolutions (also referred to as physical tracks) may allow for firmware simplification, while providing orthogonality across circumferentially adjacent sectors (regardless of what data tracks they belong to). For example, sub-track and track parity usage of data randomizer 330 where the randomizer seed is modulated or changed every revolution and every parity sector may allow orthogonality of randomization fields for the parity sectors relative to both data sectors and parity sectors of adjacent revolutions. In some configurations, the randomizer seed may be varied every parity sector to a different value relative to the per revolution or physical track randomization seed. This may ensure uniqueness of the parity sector for even data sector counts. In some configurations, seed generator 330.1 may be initiated to change the randomizer seed value each rotation, based on servo data identifying a complete rotation. Changes in track randomization seed value may be made in conjunction with varying the sector data preamble and sync word fields for adjacent revolutions, independent of data track length. Changes in parity sector randomization seed values may be triggered as part of the parity sector calculation and write process.

In some configurations, read/write channel 320 may use a data sector preamble and sync word written at the beginning of each data sector. Sector sync logic 332 may be configured to use the sector preamble and sync word fields to provide fine adjustment to the timing and gain values received from servo controller 342. For example, when determining a zero-phase start, a discrete Fourier transform (DFT) using the sector preamble and/or sync word signal may be used to correct ADC alignment for reading the data from that sector. Read/write channel 320 may benefit from being able to easily distinguish between data sector preamble and sync fields of adjacent revolutions along the spiral pattern. More specifically, the ability to easily reject data sector preamble and sync words signals from adjacent data sectors in the cross-track direction may have a number of benefits under track squeeze conditions (particularly for SMR configurations). For example, sector sync logic 332 may determine the appropriate data sector preamble and sync word for a target logical track during acquisition and identification of the desired data track. In some configurations, data sector preamble fields and data sector sync marks may be selected with alternating patterns across cross-track adjacent data sectors in adjacent revolutions, such as distinct timing patterns for the preambles and selecting sync words that are orthogonal to one another. In this context, orthogonality includes data patterns that generate signal values that are dissimilar in such a way that their read signals are easily separated from cross-track interference and/or overlap from cross-track adjacent data sectors. For example, data sectors along one revolution of the spiral may include a 2T preamble pattern and a first sync word and data sectors along the next revolution may include a 3T preamble pattern and a second sync word that is orthogonal to the first.

For example, data sector preambles may be comprised of tone patterns based on magnet sequences with a determined bit time. The orthogonality of the preamble field may be achieved by selecting cyclic bit sequences having sinusoidal waveshape in which the harmonic content is dissimilar between tracks. For example, alternating 2T and 3T magnet sequences may provide good estimates of gain and phase using a simple matched filter or DFT approach. The acquisition loop may use a zero-phase start algorithm to estimate the initial gain and phase, then preamble logic 332.1 may update the analog front end variable gain amplifier (VGA) relative to the gain error and move the ADC's sampling clock phase to align the sampling phase. When any sector being read from the track has been severely squeezed, then the usage of a sinusoidal matched filter (i.e., DFT) in preamble logic 332.1 allows the sampling of the preamble field to have good rejection of the preamble field written with the infringing adjacent track's data sector. For example, if the filters are constructed of an integer number of preamble periods for both 2T (period=4 clocks) and 3T (period=6 clocks), using matched filters having either 12 or 24 sample length may maximize correlation to the present sector being read and also reject the signal of the adjacent track.

Data sector sync word orthogonality between adjacent sectors may be achieved by choosing bit sequences and detection algorithms for sync mark logic 332.2 that have dissimilarity to the preamble fields and dissimilarity to the cross-track adjacent sync word pattern. Dissimilarity may be achieved from the preamble fields by choosing patterns having lower frequency content and by placement of the transitions in the bit sequence shifted in phase relative the preamble pattern. In some configurations, the preamble pattern may be included as a portion of the sync word to improve the correlation to a specific location in the bit sequence and improve sync word detection. For example, if the sync word pattern is constructed with phase shifts relative to the preamble field, then it becomes easier to construct a detector that uniquely locates the sync word field to identify the starting location for the encoded data field. Orthogonality between sync word bit patterns used on cross-track adjacent data sectors (whether in adjacent tracks or cross-track adjacent portions of the same long track) can be achieved by designing the sync words bit sequences and matched filter response of sync mark logic 332.2 to have minimal correlated energy. This can be done using Euclidean metrics or alternately using patterns and matched filters which minimize the correlated energy of the detection filters relative to the preamble pattern and to the adjacent track's sync word.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, seek back, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342. Servo controller 342 may provide servo control signals to motor controller 348 and motor controller 348 may control one or more actuator VCMs and/or a spindle motor for rotating the disk stack.

Servo logic 346 may be configured to use the read signals from the servo sectors along the spiral pattern to determine head location and perform positioning operations. Servo sectors may be comprised a servo preamble field for storing a periodic pattern (which allows proper gain adjustment and timing synchronization of the read signal), a servo sync mark field for storing a special sync word pattern used to symbol synchronize to a servo data field, the servo data field for storing coarse head positioning information (such as a servo track address or track identifier) used to position the head over a target data track during a seek operation, and a groups of servo bursts (e.g., N and Q servo bursts) for fine positioning during track follow operations. Servo logic 346 may include corresponding functions for receiving, recognizing, and using the servo information from each sector. For example, preamble logic may detect the pattern in the preamble field and use it to adjust gain and timing synchronization. Sync mark logic may detect the sync word pattern in the sync mark field and use it to synchronize for reading the servo data field. Track identifier (ID) logic may extract the servo track identifier and/or servo sector/spoke identifier from the servo data field for use in identifying a desired data track and/or track position.

Figure 4A:
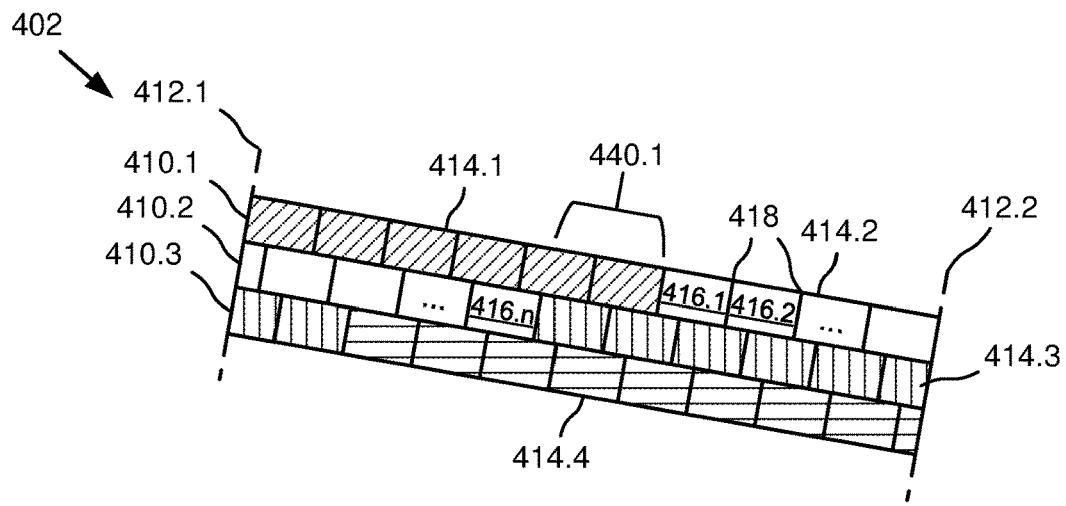
FIGS. 4A, 4B, and 4C are diagrams of example data track configurations using spiral data track patterns.
Figure 4B:
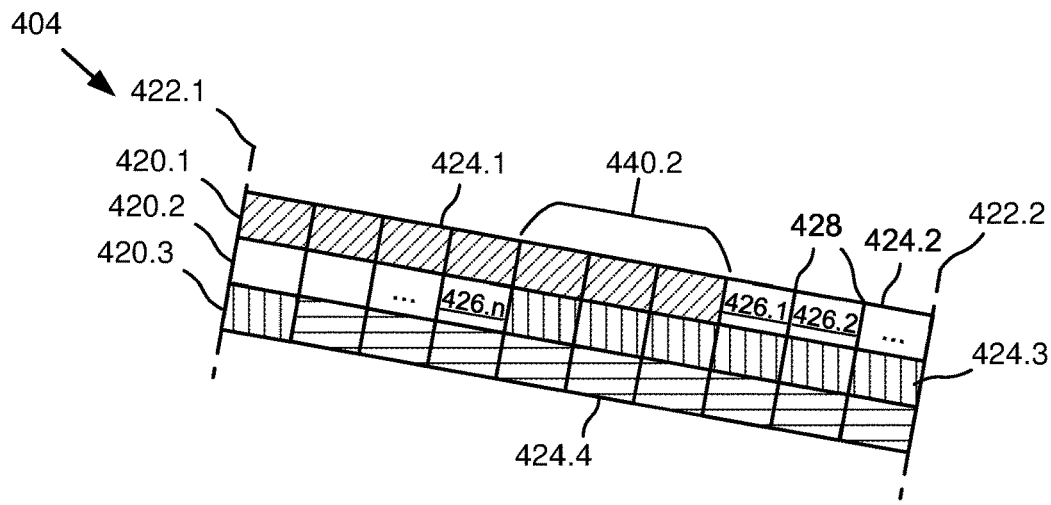
Figure 4C:
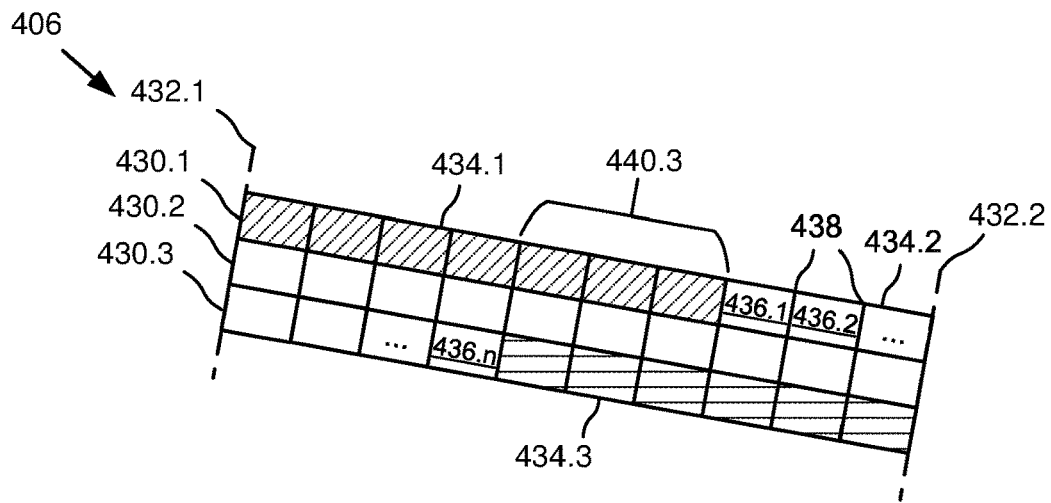
Figure 6:
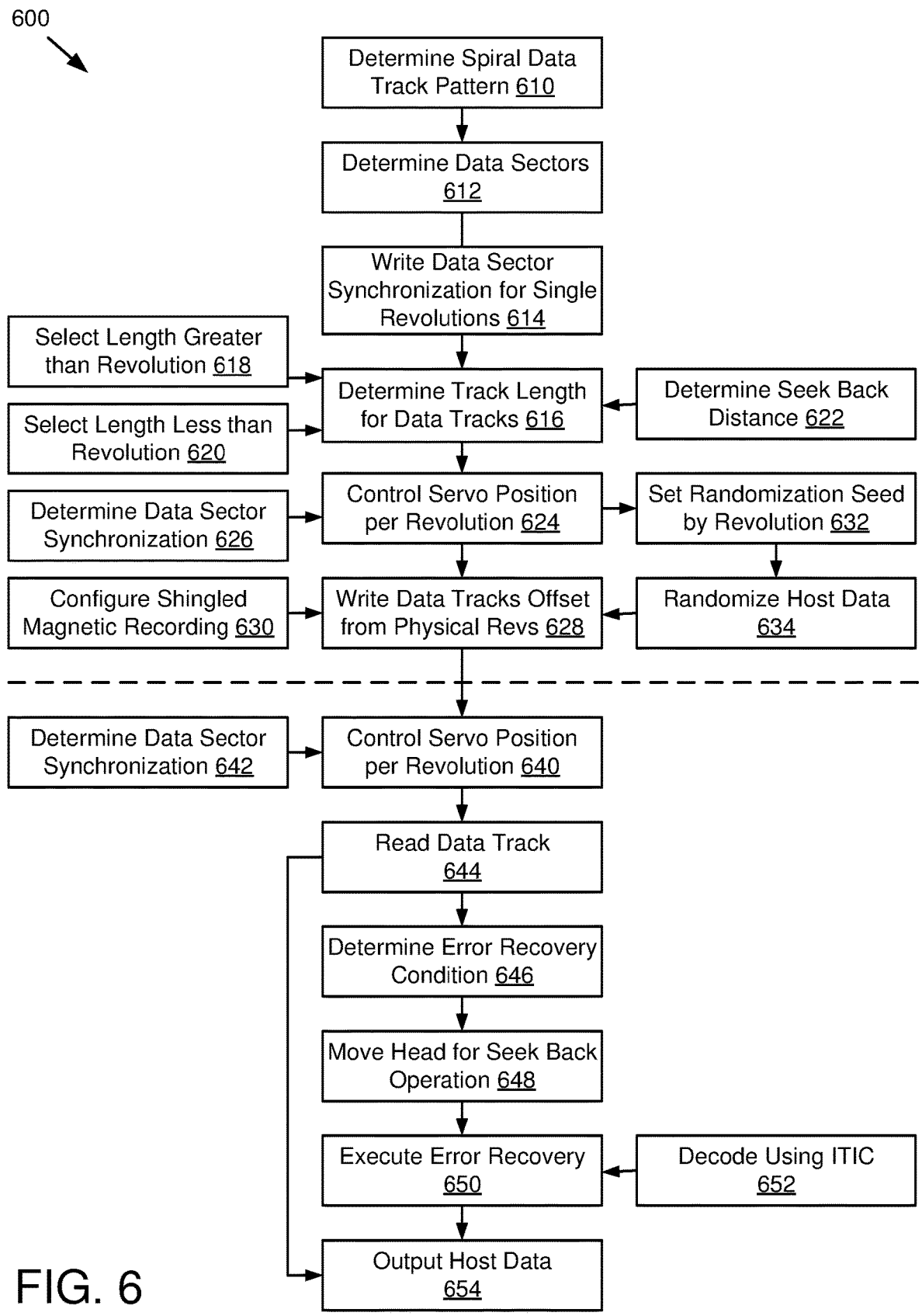
FIG. 6 is an example method of using offset spiral data tracks with data sector preamble and sync word fields on a per revolution basis.
Figure 7:
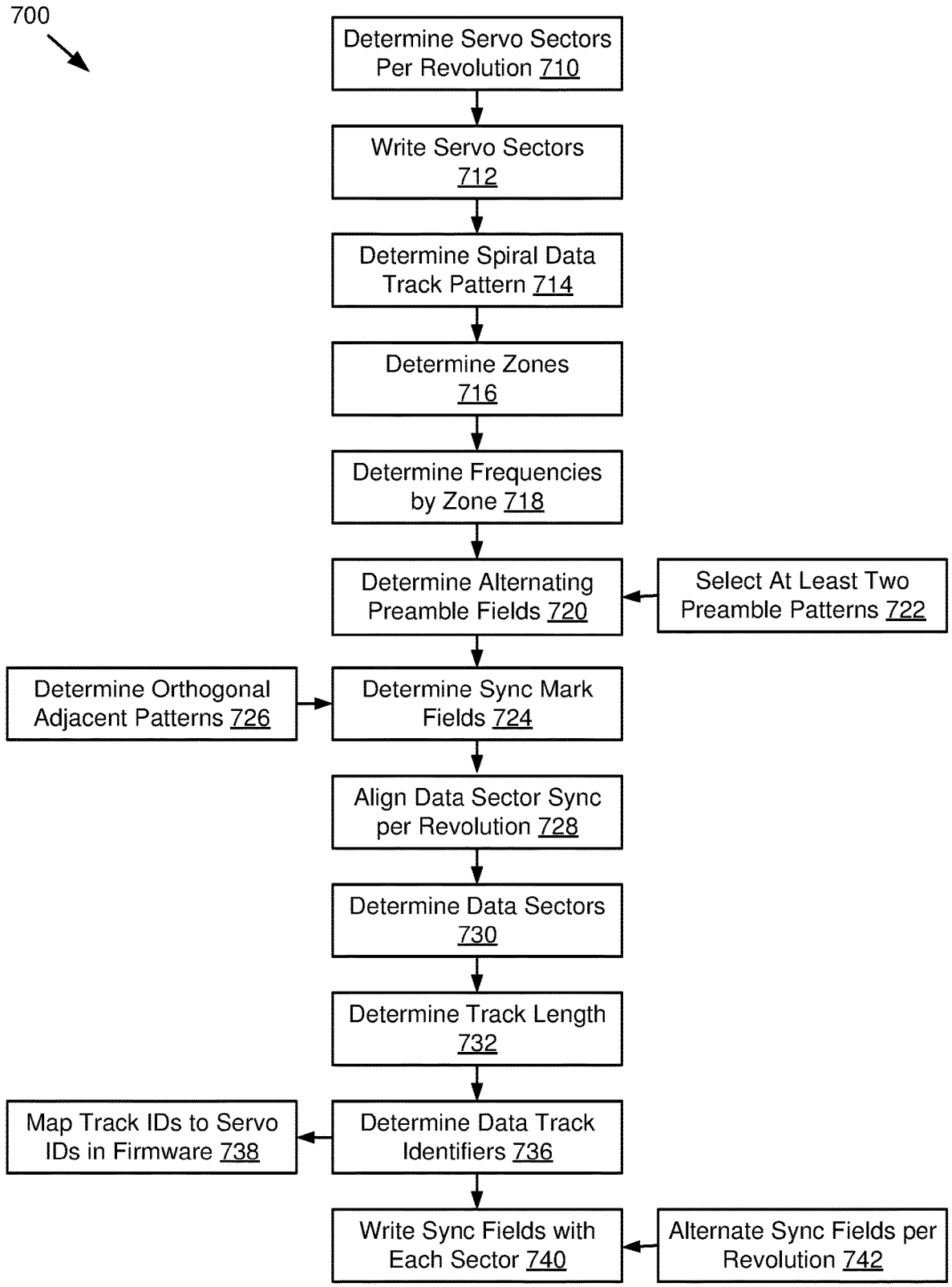
FIG. 7 is an example method of writing data sectors for offset spiral data track formats.

FIGS. 4A, 4B, and 4C show different spiral track configurations that may be used in conjunction with control circuitry 300 in FIG. 3 and/or the methods 600 and 700 of FIGS. 6 and 7. More specifically, FIG. 4A shows a spiral track configuration 402 with unaligned data sectors and a data track length less than a revolution. FIG. 4B shows a spiral track configuration 404 with aligned data sectors (shown by aligned sector boundaries 428) and a data track length less than a revolution. FIG. 4C shows a spiral track configuration 406 with aligned data sectors and a data track length greater than one revolution. In some configurations, lines 412.1, 422.1, and 432.1 may represent single revolution boundaries based on physical revolutions (for example, determined from servo information) that act as a starting point for each revolution along the spiral in a similarly formatted region (such as a zone), such that each revolution 410, 420, and 430 represents a single revolution of the storage medium. The curvature of the data tracks is not reflected due to the large difference between track width and circumference and only the segment near the start and/or end of each track is shown (not the entire track). Note that servo sectors may or may not align with data sector boundaries and logical data tracks may start and end with partial data sectors in some configurations. In some configurations, track length may not be an integer number of data sectors.

FIG. 4A shows portions of adjacent data tracks 414.1, 414.2, 414.3, and 414.4 along three revolutions 410.1, 410.2, and 410.3. Each revolution 410 forms a cross-track adjacent portion of a spiral pattern and each data track 414 form a sequentially adjacent portion of the spiral pattern. The data tracks are shown cutoff at lines 412.1 and 412.2, but would continue around a full revolution of the storage medium until the end of revolution 410.1 becomes the beginning of revolution 410.2 and then the end of revolution 410.2 becomes the beginning of revolution 410.3. Additional details of the track configurations are described with regard to data track 414.2, but similar features apply to the other data tracks. Data track 414.2 is comprised of data sectors 416 separated by data sector boundaries 418, where the track length may be expressed in terms of data sectors. Data track 414.2 has a track length n, where data sector 416.1 is the start of data track 414.2 and data sector 416.n is the end of data track 414.2. Both data track 414.1 and data track 414.3 are sequentially adjacent data tracks, where data track 414.1 directly precedes data track 414.2 along the spiral and data track 414.3 directly follows data track 414.2 along the spiral. As a result, there are portions of the spiral where data track 414.2 is also adjacent to tracks 414.1 and 414.3 in the cross-track direction. For example, data sectors 416.1 and 416.2 in revolutions 410.1 are cross-track adjacent to data sectors in data track 414.3 in revolution 410.2. Data sector 416.n (in revolution 410.2) is cross-track adjacent data sectors in revolution 410.1 for data track 414.1 and, due to the short track lengths, cross-track adjacent data sectors in 414.4 in revolution 410.3, even though separated in the down track direction of the spiral by the entire track 414.3. In the configuration shown, data sector boundaries 418 are unaligned from revolution to revolution.

FIG. 4B shows portions of adjacent data tracks 424.1, 424.2, 424.3, and 424.4 along three revolutions 420.1, 420.2, and 420.3. Each revolution 420 forms a cross-track adjacent portion of a spiral pattern and each data track 424 forms a sequentially adjacent portion of the spiral pattern. The data tracks are shown cutoff at lines 422.1 and 422.2, but would continue around a full revolution of the storage medium. Additional details of the track configurations are described with regard to data track 424.2, but similar features apply to the other data tracks. Data track 424.2 is comprised of data sectors 426 separated by data sector boundaries 428, where the track length may be expressed in terms of data sectors. Data track 424.2 has a track length n, where data sector 426.1 is the start of data track 424.2 and data sector 426.n is the end of data track 424.2. Both data track 424.1 and data track 424.3 are sequentially adjacent data tracks to data track 424.2, where data track 424.1 directly precedes data track 424.2 along the spiral and data track 424.3 directly follows data track 424.2 along the spiral. As a result, there are portions of the spiral where data track 424.2 is cross-track adjacent to tracks 424.1 and 424.3. For example, data sectors 426.1 and 426.2 in revolutions 420.1 are cross-track adjacent data sectors in data track 424.3 in revolution 420.2. Data sector 426.n (in revolution 410.2) is cross-track adjacent data sectors in revolution 420.1 for data track 424.1 and, due to the short track lengths, cross-track adjacent data sectors in 424.4 in revolution 420.3, even though separated in the down track direction of the spiral by the entire track 424.3. In the configuration shown, data sector boundaries 428 are aligned concentrically from revolution to revolution. In some configurations, both the servo sectors (not shown) and the data sectors align between cross-track adjacent tracks. In some configurations, such as tracks with variable frequency, data sectors may be aligned for revolutions in zones or other regions with the same frequency, but may not align at the borders of those zones or regions, where the next adjacent zone or region has a different frequency in the cross-track direction.

FIG. 4C shows portions of adjacent data tracks 434.1, 434.2, and 434.3 along three revolutions 430.1, 430.2, and 430.3. Each revolution 430 forms a concentrically adjacent portion of a spiral pattern and each data track 434 form a sequentially adjacent portion of the spiral pattern. The data tracks are shown cutoff at lines 432.1 and 432.2, but would continue around a full revolution of the storage medium. Additional details of the track configurations are described with regard to data track 434.2, but similar features apply to the other data tracks. Data track 434.2 is comprised of data sectors 436 separated by data sector boundaries 438, where the track length may be expressed in terms of data sectors. Data track 434.2 has a track length n, where data sector 436.1 is the start of data track 434.2 and data sector 436.n is the end of data track 434.2. Both data track 434.1 and data track 434.3 are sequentially adjacent data tracks to data track 434.2, where data track 434.1 directly precedes data track 434.2 along the spiral and data track 434.3 directly follows data track 434.2 along the spiral. As a result, there are portions of the spiral where data track 434.2 is also adjacent to tracks 434.1 and 434.3 in the cross-track direction. For example, data sectors from data track 434.2 in revolution 430.2 are cross-track adjacent to data sectors in data track 434.1 in revolution 420.1 and data track 434.3 in revolution 430.3. Due to the long track length occupying the entirety of revolution 430.2, some data sectors in data track 434.2 are cross-track adjacent other data sectors in data track 434.2. For example, data sectors 436.1, data sector 436.2, and others in revolution 430.1 are cross-track adjacent data sectors in revolution 430.2 and so are data sector 426.n and others in revolution 430.3. In the configuration shown, data sector boundaries 438 are aligned concentrically from revolution to revolution. In some configurations, both the servo sectors (not shown) and the data sectors may align across cross-track adjacent tracks, as well as cross-track adjacent sectors belonging to the same data track (as shown for data track 434.2). In some configurations, such as data tracks with variable frequency, data sectors may be aligned for revolutions in zones or other regions with the same frequency, but may not align at the borders of those zones or regions, where the cross-track adjacent zone or region has a different frequency.

In some configurations, a seek back skew distance 440 may be determined between the end of a data track (on one revolution) and the start of that data track (on another revolution). Seek back skew distance 440 may be large enough to allow for head repositioning where the seek distance across one or more track widths to return to the start of the data track does not require another full revolution of the medium. In some configurations, the end of each data track may be radially offset by a number of sectors. For aligned sectors, the offset may be a non-zero number sectors that could be an integer value or could include partial sectors where partial sectors are supported. For short tracks, such as data track 424.2 in FIG. 4B, seek back skew distance 440.2 may be equal to the number of sectors by which the data track is shorter than a full revolution, in this case, three data sectors. For long tracks, such as data track 434.2, seek back skew distance 440.3 may be equal to a number of sectors by which the data track is shorter than an integer of revolutions greater than one, in this case, three data sectors shorter than two full revolutions. The sequential re-read of example data tracks 414.2, 424.2, and 434.2 is made more efficient by their respective seek back skew distances 440.1, 440.2, and 440.3.

Figure 5:
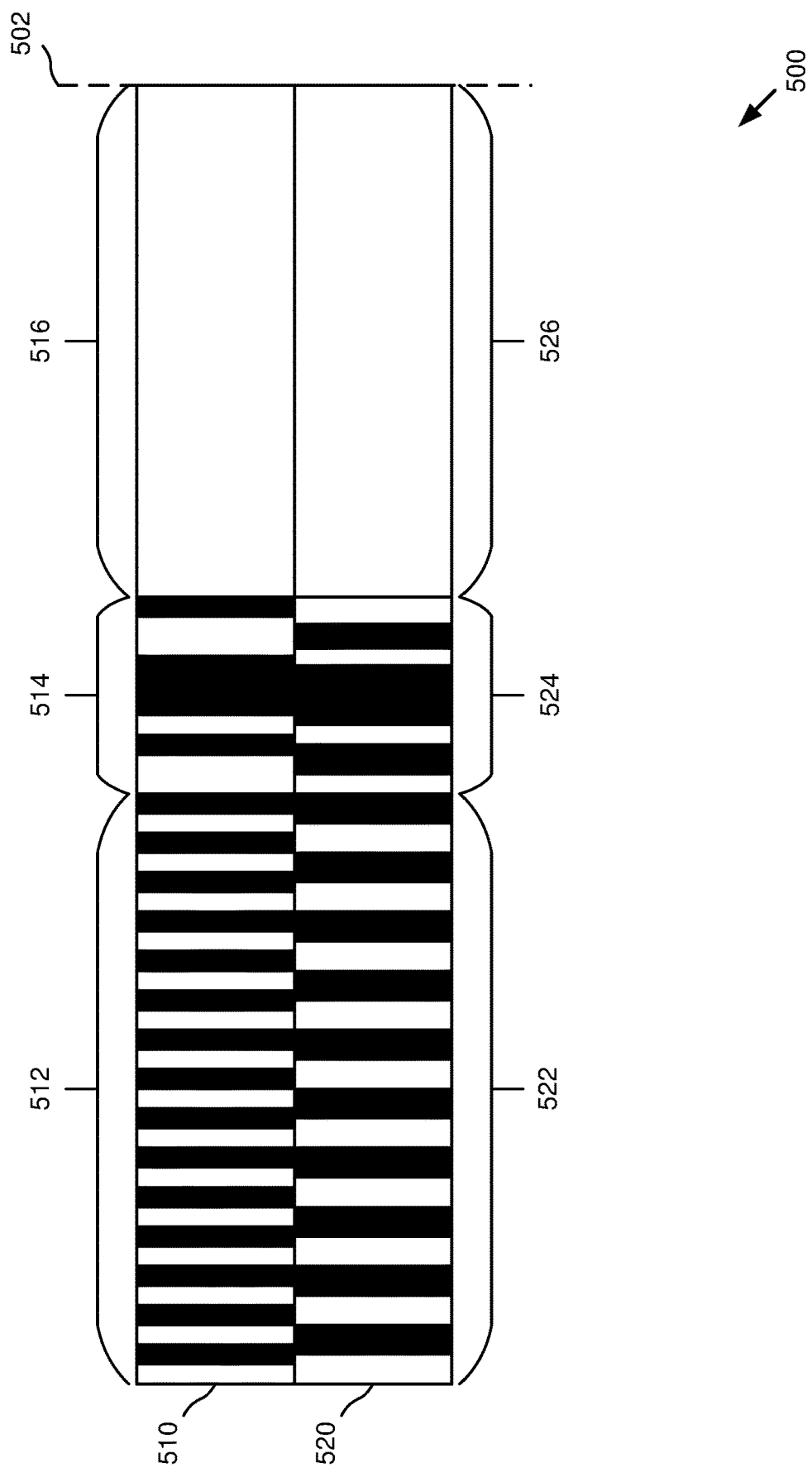
FIG. 5 is a diagram of an example set of data sector preamble and sync word fields for use in adjacent revolutions of the storage medium.

FIG. 5 shows example data sector configurations 500 for two cross-track adjacent data sectors. Data sectors 510 and 520 are truncated at line 502 and may omit additional sector headers or host data that may be present in the data sectors, but may not be relevant to the data sector format described herein. In some configurations, each data sector will begin with a data sector preamble and data sector sync word immediately following (in the down track direction) the data sector boundary. The data sector preamble and data sector sync word may be written with each data sector. In order to assist in distinguishing rotations around the spiral and to simplify processing and firmware, orthogonal preamble fields and sync mark fields on an alternating basis for cross-track adjacent data sectors may be used. For example, data sector preamble fields and sync word patterns may be preferentially chosen to be orthogonal and/or have detection constraints to improve usage under track squeeze conditions. The combination of preamble fields and sync mark fields may be collectively referred to as data sector synchronization information or data sector synchronization fields. Usage of two or more distinct preamble and sync word patterns may be preferentially aligned to boundaries defined by single full revolutions along the spiral, sometimes referred to as physical tracks or servo tracks, to simplify operations for firmware and to assure orthogonality of consecutive revolutions (regardless of logical track boundaries). For example, spiral logical data tracks may exceed the length of a single revolutions or physical track (e.g., long track) and/or be offset from revolution-based servo boundaries by varying distances (e.g., short track), but the alternating patterns would assure that the data sectors of one revolution may be distinguished from the next, even when data sectors from one track are adjacent data sectors from the same track in the cross-track direction (a common occurrence with long tracks). While alternating between two data sector patterns is shown in data sectors 510 and 520, alternating sequences of more than two data sector patterns are also possible, such as alternating three or more patterns of preamble and sync word aligned to sequential revolutions along the spiral to achieve orthogonality.

In some configurations, alternating preamble field patterns based on different tonal patterns repeating based on a selected bit time for a preamble length. As discussed above, orthogonal preamble field patterns may be selected for filtering of symbol lengths to have good rejection of adjacent track tones. For example, preamble field 512 in data sector 510 may use a 2T pattern and preamble field 522 may in cross-track adjacent data sector 520 may use a 3T pattern. Any combination of magnet lengths and preamble lengths may be used that achieve orthogonality with the cross-track adjacent data sector preamble fields.

In some configurations, programmable sync word patterns may be chosen for the sync mark fields by orthogonality and/or Euclidean distance of adjacent patterns to ensure that adjacent patterns may be easily distinguished. For example, sync word orthogonality may be achieved by short pseudo-random binary sequences (PRBS) and/or by construction of patterns having dissimilar magnet lengths and transition locations between adjacent sync mark fields 514 and 524. In some configurations, sync words may be designed to have Euclidean distance meeting a Euclidean distance threshold for detection relative to the preamble field patterns and/or matched filters may be used with some measure of margin or distance between patterns in the output of the matched filter's response.

As shown in FIG. 6, control circuitry 300 may be operated according to an example method of using offset spiral data tracks with data synchronization fields on a per revolution basis, i.e., according to the method 600 illustrated by blocks 610-654.

At block 610, a spiral data track pattern may be determined. For example, the track configuration for a data storage device may be based on one or more spiral tracks on the surface of a rotating storage medium.

At block 612, data sectors may be determined. For example, the track configuration may define each physical data unit along the spiral between data sector boundaries in the down track direction as a data sector.

At block 614, data sectors may be written with data sector synchronization fields based on single revolutions of the storage medium. For example, the track configuration may include data sector preamble fields and sync word fields for data sectors varied, for each revolution of the storage medium, at single revolution boundaries along the spiral (based on servo or spindle revolutions).

At block 616, a track length may be determined for each data track. For example, the track configuration may include a track length based on a set number of data sectors to accommodate a desired track data unit size and corresponding parity sectors. At block 618, a track length greater than a revolution may be selected and/or, at block 620 a track length less than a revolution may be selected for the entire storage medium or portions thereof. At block 622, a seek back distance may be determined. For example, the track configuration may include track lengths selected to be less than one or more revolutions by at least a non-zero number of data sectors.

At block 624, servo position may be controlled per revolution during write operations. For example, the servo controller may use servo sector data based on single revolution servo tracks and corresponding servo position identifiers to determine data track positions. At block 626, data sector synchronization may be determined for writing each data sector. For example, the write channel may use the alternating data sector preamble fields and sync mark fields to fine tune gain control, timing, and the start of the data sector data.

At block 628, data tracks may be written offset from the physical revolutions. For example, the head may write host data to spiral data tracks with start and end positions that do not align with single revolutions of the storage medium and have varying offsets from the single revolution servo sector boundary or spindle mark. In some configurations, at block 630, the data tracks may be configured for shingled magnetic recording. For example, the spiral pattern may not include guard bands between concentrically adjacent data sectors and the head may write those data sectors with overlapping write fields along the track edges.

In some configurations, at block 632, a randomization seed may be set on a per revolution basis. For example, the write channel may receive an indication of the single revolution servo sector boundary based on the servo controller and modulate or otherwise change the randomization seed for a data randomizer after each revolution. At block 634, host data may be randomized. For example, the host data written to the data tracks at block 628 may be randomized using different randomization seeds based on revolutions, rather than data tracks (resulting in single data tracks with data sectors written using different randomization seeds).

At block 640, servo position may be controlled per revolution during read operations. For example, the servo controller may use servo sector data based on single revolution servo tracks and corresponding servo position identifiers to determine data track positions. At block 626, data sector synchronization may be determined for reading each data sector. For example, the read channel may use the alternating data sector preamble fields and sync mark fields to fine tune gain control, timing, and the start of the data sector data.

At block 644, the data track may be read. For example, the read/write channel may decode the read signal from the data sectors for the data track along the spiral pattern. The data sectors for the data track may be successfully decoded and method 600 may proceed to block 654 or an error condition may arise and method 600 may proceed to block 646.

At block 646, an error recovery condition may be determined. For example, based on a threshold number of data sectors failing to decode, even using parity sector soft ECC postprocessing, a reread operation may be triggered for the data track.

At block 648, the head may be moved for a seek back operation. For example, based on the error recovery operation identified by firmware, the servo controller may move the head from the end of the data track back to the start of the data track by moving one or more track widths over a radial distance of a number of data sectors referred to as a seek back distance.

At block 650, error recovery may be executed. For example, the read/write channel may execute a reread operation with or without different read parameters from the prior read operation. In some configurations, additional data recovery features may be initiated for the reread and/or postprocessing thereof. For example, in configurations with cross-track aligned data sectors and SMR data tracks, one or more data sectors may be decoded using ITIC at block 652.

At block 654, the host data may be output. For example, after all data sectors of the data track have been successfully read and decoded, the storage manager may output the data read from the data track to the host through the host interface.

As shown in FIG. 7, control circuitry 300 may be operated according to an example method of writing data sectors for offset spiral data track formats, i.e., according to the method 700 illustrated by blocks 710-738.

At block 710, servo sectors may be determined. For example, the track configuration may include servo sectors distributed around the disk according to the servo frequency and servo track pitch. Some track configurations may include aligned servo sectors across adjacent revolutions.

At block 712, servo sectors may be written to the storage medium. For example, the data storage device may be configured for self-servo write during the manufacturing process or may have the servo sectors written to the storage medium on a servo writer prior to installation in the data storage device.

At block 714, a spiral data track pattern may be determined. For example, the track configuration for a data storage device may be based on one or more spiral data track patterns on the surface of a rotating storage medium.

At block 716, zones may be determined for the data storage device. For example, the track configuration may divide the one or more spiral tracks into zones and/or other regions of continuously adjacent tracks with similar formatting.

At block 718, frequencies may be determined for each zone. For example, the track configuration may include a uniform frequency for all zones, incremental frequency changes from zone-to-zone, and/or zones with incremental frequency changes within a zone based on changing frequency every revolution or adjacent sets of revolutions along the spiral.

At block 720, alternating data sector preamble fields may be determined. For example, the track configurations may include multiple preamble patterns that are alternated on a per revolution bases. At block 722, at least two preamble patterns may be selected. For example, the data sector format may include two, three, or more alternating patterns, such as 2T, 3T, and/or 5T patterns.

At block 724, data sync mark fields may be determined. For example, the track configuration may include multiple computationally distinct sync word patterns for the sync mark fields that are alternated on a per revolution basis. At block 726, orthogonal sync word patterns may be determined for circumferentially adjacent data sectors. For example, the track configuration may include at least two sync word patterns that are orthogonal to one another may be selected for use in different data sectors.

At block 728, data sector synchronization data may be aligned per revolution. For example, the track configuration may alternate the data synchronization fields used each physical revolution, such as at a single revolution servo sector boundary or spindle mark that marks each revolution along the one or more spirals or based on a servo sector count and radial spacing determined from the frequency.

At block 730, data sectors may be determined. For example, the track configuration may define data sectors falling between each pair of data sector boundaries along the spiral including the features determined at blocks 720 and 724 (along with additional features contained in data sector headers, parity sectors, etc.).

At block 732, track length may be determined. For example, the track configuration may include one or more track lengths for data tracks that are offset from the number of data sectors in one revolution of the storage medium, such as data tracks with a number of data sectors that are less than or greater than the number of data sectors in one revolution.

At block 736, data track identifiers may be determined. For example, the track configuration may include unique identifiers for determining data track position from servo track identifiers (in the servo data) mapped to logical track identifiers (in firmware). At block 738, track identifiers may be mapped to servo identifiers in firmware. For example, track configuration may include a polynomial function for converting servo positioning information into logical data track locations along the spiral.

At block 740, data sector synchronization fields may be written with each data sector. For example, each data sector may start with a data sector preamble field and a data sector sync mark field. At block 742, the synchronization fields may be alternated per revolution as data sectors are written. For example, the write channel may write the different synchronization fields determined for alternating rotations at blocks 720 and 724, and aligned at block 728 to the storage medium according to the track configuration.

Technology for improved spiral track formats for data storage devices using data tracks offset from single revolutions of servo sectors along the spiral is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
   a storage medium configured for a plurality of data tracks written in at least one continuous spiral pattern, wherein:
      the plurality of data tracks comprises:
         a first group of adjacent tracks having a first sector frequency; and
         a second group of adjacent tracks having a second sector frequency; and
      the first sector frequency is different than the second sector frequency;
   a head actuated over a surface of the storage medium; and
   a control circuitry configured to write, to the storage medium, data tracks having track lengths that are different than a single revolution of the storage medium, wherein the track lengths are comprised of data sectors along the at least one continuous spiral pattern.

2. The data storage device of claim 1, wherein the track lengths are less than the single revolution of the storage medium.

3. The data storage device of claim 2, wherein:
   the track lengths of adjacent data tracks are less than the single revolution by at least a number of data sectors; and
   the number of data sectors is at least a seek distance for moving the head from an end of a target track to a start of the target track during a seek back operation.

4. The data storage device of claim 1, wherein the track lengths are greater than the single revolution of the storage medium.

5. The data storage device of claim 4, wherein:
   the track lengths of the data tracks are less than a first number of revolutions by at least a second number of data sectors; and
   the second number of data sectors is at least a seek distance for moving the head from an end of a target track to a start of the target track during a seek back operation.

6. The data storage device of claim 1, wherein:
   the first group of adjacent tracks have aligned sector boundaries across data sectors in adjacent tracks; and
   the second group of adjacent tracks have aligned sector boundaries across data sectors in adjacent tracks.

7. The data storage device of claim 6, wherein the control circuitry is further configured to:
   write data tracks in the first group of adjacent tracks with overlapping edges between circumferentially adjacent tracks; and
   decode, during error recovery operations, data tracks in the first group of adjacent tracks using inter-track-interference cancellation across aligned data sectors.

8. The data storage device of claim 1, wherein:
   the data sectors include preamble fields comprised of preamble field patterns;
   the data sectors on a first revolution of the at least one continuous spiral pattern have a first preamble field pattern;
   the data sectors on a second revolution of the at least one continuous spiral pattern have a second preamble field pattern;
   the data sectors on the first revolution are adjacent the data sectors in the second revolution in a cross-track direction; and
   the first preamble field pattern is orthogonal to the second preamble field pattern.

9. The data storage device of claim 1, wherein:
   the data sectors include sync word fields comprised of sync word patterns;
   the data sectors on a first revolution of the at least one continuous spiral pattern have a first sync word pattern;
   the data sectors on a second revolution of the at least one continuous spiral pattern have a second sync word pattern;
   the data sectors on the first revolution are adjacent the data sectors in the second revolution in a cross-track direction; and
   the first sync word pattern is orthogonal to the second sync word pattern.

10. The data storage device of claim 1, wherein the control circuitry is further configured to:
    randomize data being written to the data sectors; and
    set a seed value for randomization based on the single revolution of the storage medium.

11. A method comprising:
    determining, on a storage medium of a data storage device, a plurality of servo sectors configured for single revolutions of the storage medium;
    writing, to the storage medium of the data storage device, a plurality of data tracks along at least one continuous spiral pattern, wherein the plurality of data tracks is comprised of data sectors and has track lengths that are different than a single revolution of the storage medium; and
    moving, during a seek back operation, a head of the data storage device a seek distance from an end of a target track to a beginning of the target track, wherein:
       the target track is among the plurality of data tracks;
       the track lengths of the plurality of data tracks are less than a first number of revolutions by at least a second number of data sectors; and
       the second number of data sectors is at least the seek distance.

12. The method of claim 11, wherein the track lengths are greater than the single revolution of the storage medium.

13. The method of claim 11, further comprising:
    writing, in the plurality of data tracks, a first group of adjacent tracks having a first sector frequency; and
    writing, in the plurality of data tracks, a second group of adjacent tracks having a second sector frequency, wherein:
       the first sector frequency is different than the second sector frequency;
       the first group of adjacent tracks have aligned sector boundaries across data sectors in adjacent tracks; and
       the second group of adjacent tracks have aligned sector boundaries across data sectors in adjacent tracks.

14. The method of claim 13, further comprising:
    writing data tracks in the first group of adjacent tracks with overlapping edges between circumferentially adjacent tracks; and
    decoding, during error recovery operations, data tracks in the first group of adjacent tracks using inter-track-interference cancellation across aligned data sectors.

15. The method of claim 11, further comprising:
    determining, using preamble fields in the data sectors, data sector synchronization, wherein:
       the preamble fields are comprised of preamble field patterns;
       the data sectors on a first revolution of the at least one continuous spiral pattern have a first preamble field pattern;

the data sectors on a second revolution of the at least one continuous spiral pattern have a second preamble field pattern;
the data sectors on the first revolution are adjacent the data sectors in the second revolution in a cross-track direction; and
the first preamble field pattern is orthogonal to the second preamble field pattern.

16. The method of claim 11, further comprising:
determining, using sync word fields in the data sectors, data sector synchronization, wherein:
the sync word fields are comprised of sync word patterns;
the data sectors on a first revolution of the at least one continuous spiral pattern have a first sync word pattern;
the data sectors on a second revolution of the at least one continuous spiral pattern have a second sync word pattern;
the data sectors on the first revolution are adjacent the data sectors in the second revolution in a cross-track direction; and
the first sync word pattern is orthogonal to the second sync word pattern.

17. The method of claim 11, further comprising:
randomizing data being written to the data tracks; and
setting a seed value for randomization based on servo sectors corresponding to the single revolution of the storage medium.

18. A data storage device comprising:
a storage medium configured for a plurality of data tracks written in at least one continuous spiral pattern;
a head actuated over a surface of the storage medium;
means for writing, to the storage medium, data tracks having track lengths that are different than a single revolution of the storage medium, wherein the track lengths are comprised of data sectors along the at least one continuous spiral pattern; and
means for moving, during a seek back operation, a head of the data storage device a seek distance from an end of a target track to a beginning of the target track; wherein:
the target track is among the plurality of data tracks;
the track lengths of adjacent data tracks in the plurality of data tracks are less than the single revolution of the storage medium by at least a number of data sectors; and
the number of data sectors is at least the seek distance.

19. A data storage device, comprising:
a storage medium configured for a plurality of data tracks written in at least one continuous spiral pattern;
a head actuated over a surface of the storage medium; and
a control circuitry configured to write, to the storage medium, data tracks having track lengths that are different than a single revolution of the storage medium, wherein:
the track lengths are comprised of data sectors along the at least one continuous spiral pattern;
the data sectors include preamble fields comprised of preamble field patterns;
the data sectors on a first revolution of the at least one continuous spiral pattern have a first preamble field pattern;
the data sectors on a second revolution of the at least one continuous spiral pattern have a second preamble field pattern;
the data sectors on the first revolution are adjacent the data sectors in the second revolution in a cross-track direction; and
the first preamble field pattern is orthogonal to the second preamble field pattern.

20. A data storage device, comprising:
a storage medium configured for a plurality of data tracks written in at least one continuous spiral pattern;
a head actuated over a surface of the storage medium; and
a control circuitry configured to write, to the storage medium, data tracks having track lengths that are different than a single revolution of the storage medium, wherein:
the track lengths are comprised of data sectors along the at least one continuous spiral pattern;
the data sectors include sync word fields comprised of sync word patterns;
the data sectors on a first revolution of the at least one continuous spiral pattern have a first sync word pattern;
the data sectors on a second revolution of the at least one continuous spiral pattern have a second sync word pattern;
the data sectors on the first revolution are adjacent the data sectors in the second revolution in a cross-track direction; and
the first sync word pattern is orthogonal to the second sync word pattern.

21. A data storage device, comprising:
a storage medium configured for a plurality of data tracks written in at least one continuous spiral pattern;
a head actuated over a surface of the storage medium; and
a control circuitry configured to:
randomize data being written to data sectors along the plurality of data tracks;
set a seed value for randomization based on a single revolution of the storage medium; and
write, to the storage medium, data tracks having track lengths that are different than the single revolution of the storage medium, wherein the track lengths are comprised of the data sectors along the at least one continuous spiral pattern.

22. The data storage device of claim 21, wherein:
the track lengths of the data tracks are less than a first number of revolutions by at least a second number of data sectors; and
the second number of data sectors is at least a seek distance for moving the head from an end of a target track to a start of the target track during a seek back operation.

* * * * *